(12) United States Patent
Kim et al.

(10) Patent No.: US 8,780,063 B2
(45) Date of Patent: Jul. 15, 2014

(54) TOUCH DISPLAY PANEL AND METHOD OF MANUFACTURING THE SAME

(75) Inventors: Kyu-Young Kim, Suwon-si (KR); Youn-Gu Lee, Suwon-si (KR); Nam-Ok Jung, Hwaseong-si (KR); Gug-Rae Jo, Asan-si (KR); Dae-Young Lee, Suwon-si (KR)

(73) Assignee: Samsung Display Co., Ltd., Yongin (KR)

(*) Notice: Subject to any disclaimer, the term of this patent is extended or adjusted under 35 U.S.C. 154(b) by 401 days.

(21) Appl. No.: 13/172,167

(22) Filed: Jun. 29, 2011

(65) Prior Publication Data

US 2012/0038567 A1 Feb. 16, 2012

(30) Foreign Application Priority Data

Aug. 13, 2010 (KR) .......................... 10-2010-0078067

(51) Int. Cl.
| | | |
|---|---|---|
| *G06F 3/041* | (2006.01) | |
| *G06F 3/045* | (2006.01) | |
| *G09G 3/38* | (2006.01) | |
| *H01L 21/00* | (2006.01) | |

(52) U.S. Cl.
USPC ............. 345/173; 345/107; 345/174; 438/29

(58) Field of Classification Search
USPC .............. 345/173, 107, 174, 76; 349/160, 12
See application file for complete search history.

(56) References Cited

U.S. PATENT DOCUMENTS

| | | | |
|---|---|---|---|
| 8,487,840 B2* | 7/2013 | Sato ................................ 345/76 |
| 2005/0280635 A1* | 12/2005 | Hinata .......................... 345/173 |
| 2008/0079697 A1* | 4/2008 | Lee et al. ...................... 345/173 |
| 2009/0237365 A1* | 9/2009 | Choi et al. .................... 345/173 |
| 2010/0033448 A1 | 2/2010 | Koito et al. |
| 2010/0103119 A1* | 4/2010 | Huang .......................... 345/173 |
| 2013/0120288 A1* | 5/2013 | Min ............................... 345/173 |

FOREIGN PATENT DOCUMENTS

| | | |
|---|---|---|
| JP | 2007-225896 | 9/2007 |
| JP | 2008-165435 | 7/2008 |
| KR | 10-2004-0095941 | 11/2004 |

* cited by examiner

*Primary Examiner* — Kent Chang
*Assistant Examiner* — Kuo Woo
(74) *Attorney, Agent, or Firm* — H.C. Park & Associates, PLC

(57) ABSTRACT

A touch display panel may include a display unit and a touch unit. The display unit may include a first base substrate having a plurality of pixel electrodes, a second base substrate including a common electrode disposed on a first face of the second base substrate, and an electro optical layer disposed between the pixel electrodes and the common electrode. The first face faces the first base substrate. The touch unit includes a color filter layer including a plurality of color filters and a first electrode part including first electrodes disposed on a second face of the second base substrate, and a third base substrate including a second electrode part extended along a direction crossing the first electrodes. The first electrodes may be disposed on a boundary area of the color filters having different colors from each other, so that mixing of the colors is prevented.

23 Claims, 15 Drawing Sheets

TOUCH DISPLAY PANEL AND METHOD OF MANUFACTURING THE SAME

CROSS REFERENCE TO RELATED APPLICATION

This application claims priority from and the benefit of Korean Patent Application No. 2010-78067, filed on Aug. 13, 2010, which is hereby incorporated by reference for all purposes as if fully set forth herein.

BACKGROUND OF THE INVENTION

1. Field of the Invention

Exemplary embodiments of the present invention relate to a touch display panel with a reduced number of substrates and a method for manufacturing the touch display panel.

2. Description of the Background

A touch screen panel can be classified as a resistive type touch display panel or a capacitive type touch display panel based on a sensing method of a touch on a screen of the touch screen panel.

Generally, the resistive touch screen panel may include a first touch substrate including a first touch electrode and a first line electrically connected to the first touch electrode and a second touch substrate including a second touch electrode extending along a direction crossing the first touch electrode. The resistive touch screen panel may also include a second line electrically connected to the second touch electrode. The resistive touch screen panel may be formed by combining the first touch substrate with the second touch substrate. The first and second touch substrates can be spaced apart from each other by spacers that maintain a gap between the first touch substrate and the second touch substrate. Generally, a conventional touch display panel may need at least five or more substrates including a first display substrate, a second display substrate, a color filter substrate, a first touch substrate, and a second touch substrate.

Since a display panel displays an image using a reflecting light or a transmitting light, the structure including at least five or more deposited substrates reduces an optical efficiency. In addition, an increase of the number of substrates causes an increase of a manufacturing cost and a complication of a manufacturing process.

SUMMARY OF THE INVENTION

Example embodiments of the present invention provide a touch display panel with a reduced number of substrates to enhance an optical efficiency.

Example embodiments of the present invention also provide a method of manufacturing the touch display panel.

Additional features of the invention will be set forth in the description which follows, and in part will be apparent from the description, or may be learned by practice of the invention.

Exemplary embodiments of the present invention provide a touch display panel including a display unit and a touch unit. The display unit includes a first base substrate including a plurality of pixel electrodes, a second base substrate including a common electrode disposed on a first face of the second base substrate. The first face faces the first base substrate. The display unit further includes an electro optical layer disposed between the pixel electrodes and the common electrode. The touch unit includes a color filter layer including a plurality of color filters, a first electrode part including first electrodes disposed on a second face of the second base substrate. The first electrodes are located in an area corresponding to a boundary area of a first color filter and a second color filter. The second color filter has a different color than a color of the first color filter. The touch unit further includes a third base substrate including a second electrode part extended along a direction crossing the first electrodes.

Exemplary embodiments of the present invention also provide a method of manufacturing a touch display panel. The method includes forming a first substrate including a plurality of pixel electrodes formed on a first base substrate, and laminating a second base substrate on the first substrate. The second base substrate includes a common electrode and an electro optical layer. The electro optical layer is formed on a first face of the second base substrate. The method further includes forming a color filter layer including a plurality of color filters on a second face of the second base substrate, and forming a first electrode part including a first electrode disposed on the second face of the second base substrate and a first line part electrically connected to the first electrode. The first electrode is located in a location corresponding to a boundary area of a first color filter and a second color filter. The second color filter has a different color than a color of the first color filter. The method further includes forming a third substrate including a second electrode part extended along a direction crossing the first electrodes and a second line part electrically connected to the second electrode part, and combing the second base substrate with the third substrate such that the first electrode part faces the second electrode part.

Exemplary embodiments of the present invention also provide a method of manufacturing a touch display panel. The method includes forming a first substrate including a plurality of pixel electrodes formed on a first base substrate, and laminating a second base substrate on the first substrate. The second base substrate includes a common electrode and an electro optical layer. The electro optical layer is formed on a first face of the second base substrate. The method further includes forming a third base substrate including a second electrode part, a second line part electrically connected to the second electrode part, and a color filter layer including a plurality of color filters. The method further includes forming a first electrode part including a first electrode disposed on a second face of the second base substrate, a first line part electrically connected to the first electrode part and a reflecting plate. The first electrode is located in an area corresponding to a boundary area of a first color filter and a second color filter. The second color filter has a different color than a color of the first color filter and the first electrode is extended along a direction crossing the second electrode part. The method further includes combining the second base substrate with the third substrate such that the first electrode part faces the second electrode part.

Exemplary embodiments of the present invention also provide a touch display panel including a display unit and a touch unit. The display unit includes a first substrate and at least a first portion of a second substrate. The display unit is configured to display an image. The touch unit includes a third substrate and at least a second portion of the second substrate. The touch unit is configured to detect a touch position on the touch display panel. The second substrate is disposed between the first substrate and the third substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
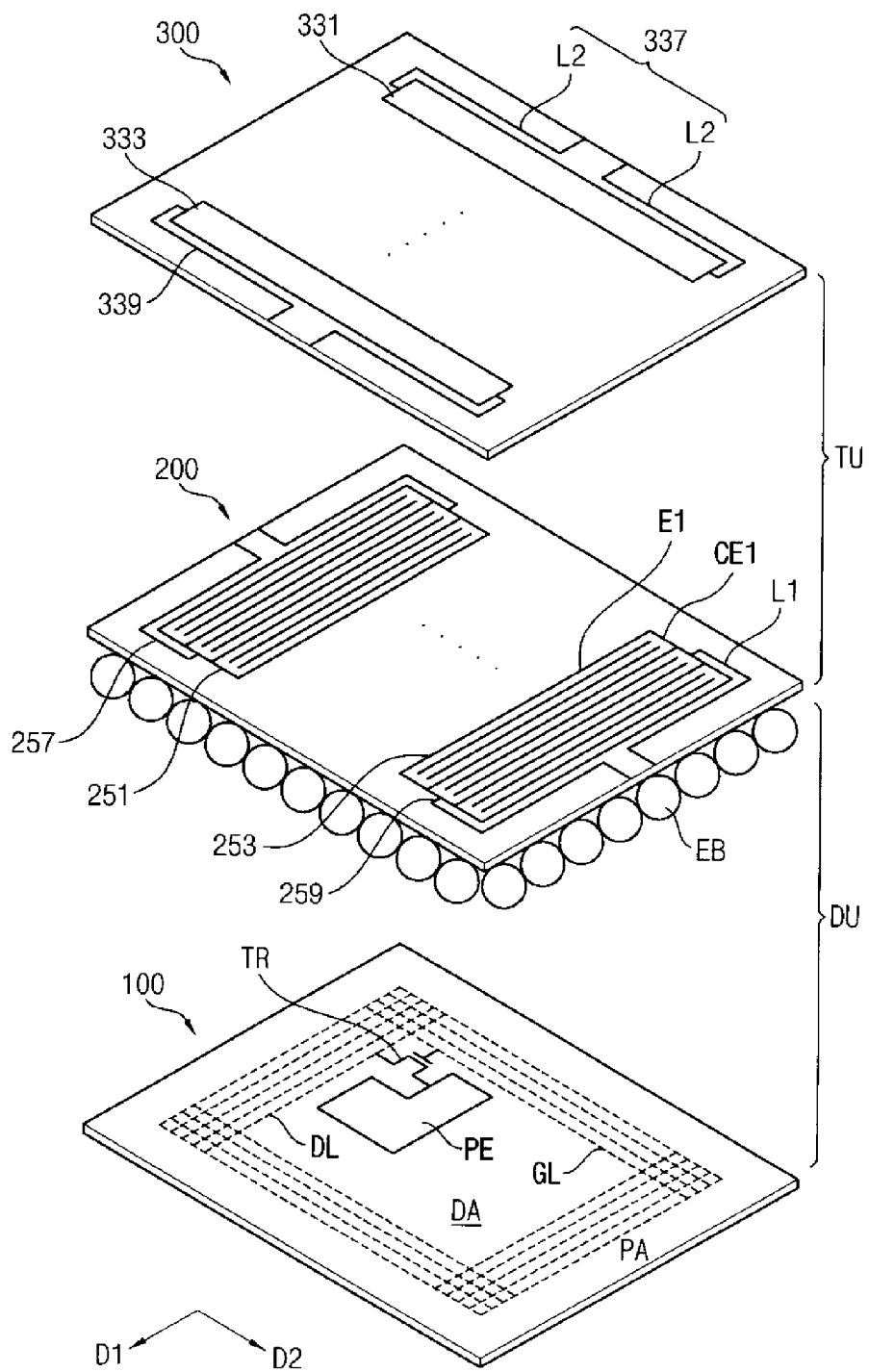
FIG. 1 is an exploded perspective view illustrating a touch display panel according to exemplary embodiments of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

The terminology used herein is for the purpose of describing exemplary embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Hereinafter, exemplary embodiments of the present invention will be explained in detail with reference to the accompanying drawings.

Touch Display Panel

Figure 2:
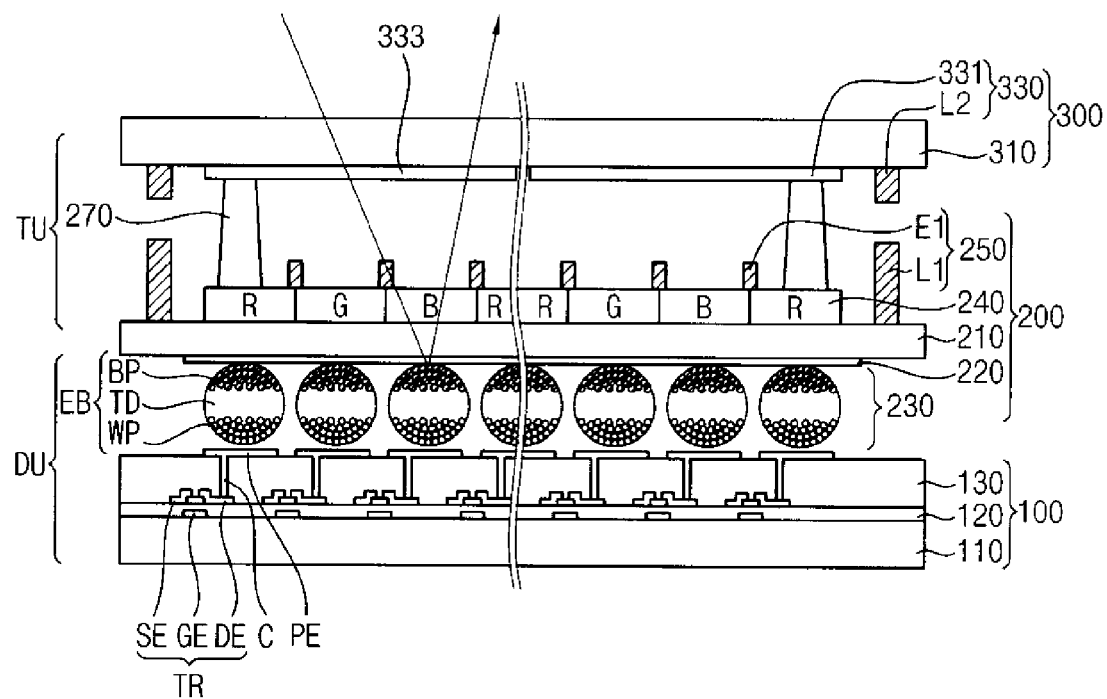
FIG. 2 is a cross-sectional view of the touch display panel of FIG. 1 according to exemplary embodiments of the present invention.

FIG. 1 is an exploded perspective view illustrating a touch display panel according to exemplary embodiments of the present invention. FIG. 2 is a cross-sectional view of the touch display panel of FIG. 1.

Referring to FIG. 1 and FIG. 2, the touch display panel may include a first substrate 100, a second substrate 200, and a third substrate 300. Alternatively, the touch display panel may include a display unit DU and a touch unit TU, including the first substrate 100, the second substrate 200, and the third substrate 300, as shown in FIG. 1.

The first substrate 100 may include a first base substrate 110, a plurality of data lines DL, a plurality of gate lines GL, a plurality of switching elements TR, and a plurality of pixel electrodes PE.

The first base substrate 110 may be composed of any suitable material including, for example, glass and plastic. The first base substrate 110 may include a display area DA including a plurality of pixel areas and a peripheral area PA surrounding the display area DA. The pixel electrodes PE may be arranged in the display area. The pixel electrodes PE may be composed of any suitable material including, for example, a transparent conductive material or an opaque conductive material. The data lines DL may extend along a first direction D1, and the gate lines GL may extend along the second direction D2 crossing (i.e., perpendicular to) the first direction D1. Each of the switching elements TR may include a control electrode connected to the gate line GL, an input electrode connected to the data line DL, and an output electrode connected to the pixel electrode PE. For example, a switching element TR may be a switching device such as a transistor. The switching element may include a source electrode SE, a gate electrode GE, and a drain electrode DE. The drain electrode DE may be coupled to the pixel electrode PE.

The second substrate 200 may include a second base substrate 210, a common electrode 220, an electro optical layer 230, a color filter layer 240, a first touch electrode part 250, and a plurality of spacers 270.

The second base substrate 210 may be composed of any suitable material including, for example, a flexible plastic material. For example, the second base substrate 210 may include polyethylene terephthalate (PET). The second base substrate 210 may have a first face facing the first base substrate 110 and a second face facing the third face substrate 310.

The common electrode 220 and the electro optical layer 230 may be disposed on the first face of the second base substrate 210.

The common electrode 220 may face the pixel electrodes PE formed in the first substrate 100.

The electro optical layer 230 may be an electrophoretic layer including negative charged and positive charged electrophoretic particles. The electro optical layer 230 may include a plurality of electrophoretic balls EB and a binder (not shown) combining at least some of the electrophoretic balls EB. Each of the electrophoretic balls EB may include negative charged and positive charged electrophoretic particles.

For example, the electrophoretic ball EB may include a white particle WP charged with a positive charge or a negative charge, a black particle BP charged with an opposite polarity to the white particle WP, and a transparent dielectric TD. The electro optical layer 230 may be disposed between the common electrode 220 and the pixel electrodes PE, and may display a gray scale by arranging the white particle WP and the black particle BP in response to an electric field between the common electrode 220 and the pixel electrodes PE. The white particle WP may reflect light, and the black particle BP may absorb light. As the white particle WP is disposed to face the second substrate 200, light may be reflected, at least in part, by the white particle WP to display a higher gray scale. As the black particle BP is disposed to face the first substrate 100, light may be absorbed, at least in part, by the black particle BP to display a lower gray scale.

The color filter layer 240, the first touch electrode 250, and the spacers 270 may be disposed on the second face of the second base substrate 210. The color filter layer 240 may include a plurality of color filters R, G, and B, and may be disposed on an area corresponding to the display area DA of the first substrate 100.

The first touch electrode 250 may include a plurality of first electrode parts 251 and 253 and a plurality of first line parts 257 and 259.

The first electrode parts 251 and 253 may extend along the first direction D1 and may be disposed on an area of the color filter layer 240 corresponding to the display area DA. Each of the first electrode parts 251 and 253 may include a plurality of first electrodes E1 and a plurality of first connecting electrodes CE1. The first electrodes E1 may be disposed on a boundary area of neighboring color filters having different colors from each other. For example, a first electrode E1 may be disposed in an area corresponding to the boundary area between a first color filter and a second color filter. The first electrodes E1 may be any suitable shape including, for example, a bar shape or a linear shape. The first connecting electrodes CE1 may extend along the second direction D2 and may connect ends of the first electrodes E1 to each other.

The first line parts 257 and 259 may be disposed on an area of the second base substrate 210 corresponding to the peripheral area PA. The first line parts 257 and 259 may be electrically connected to the first electrode parts 251 and 253 to electrically connect the first electrode parts 251 and 253 to an external device. Each of the first line parts 257 and 259 may include first lines L1 connected to each of the first connecting electrodes CE1 of the first electrode part 253.

The spacers 270 may be disposed between the second substrate 200 and the third substrate 300 and may maintain a gap between the second substrate 200 and the third substrate 300.

The third substrate 300 may include a third base substrate 310 and a second touch electrode part 330.

The third base substrate 310 may be made of any suitable material including, for example, glass or plastic.

The second touch electrode part 330 may include a plurality of second electrode parts 331 and 333 and a plurality of second line parts 337 and 339.

The second electrode parts 331 and 333 may extend along the second direction D2 and may be disposed on an area of the third base substrate 310 corresponding to the display area DA. The second line parts 337 and 339 may be disposed on an area of the third base substrate 310 corresponding to the peripheral area PA. The second line parts 337 and 339 may be electrically connected to the second electrode parts 331 and 333 to electrically connect the second electrode parts 331 and 333 to an external device. Each of the second line parts 337 and 339 may include second lines L2 connected to each end of the second electrode parts 331 and 333.

As described above, the display unit DU of the touch display panel may include the first substrate 100, the common electrode 220 disposed on the first face of the second substrate 210, and the electro optical layer 230. The touch unit TU of the touch display panel may include the color filter layer 240 disposed on the second face of the second substrate 210, the first touch electrode part 250, the spacers 270, and the third substrate 300.

Method for Manufacturing a Touch Display Panel

Figure 3A:
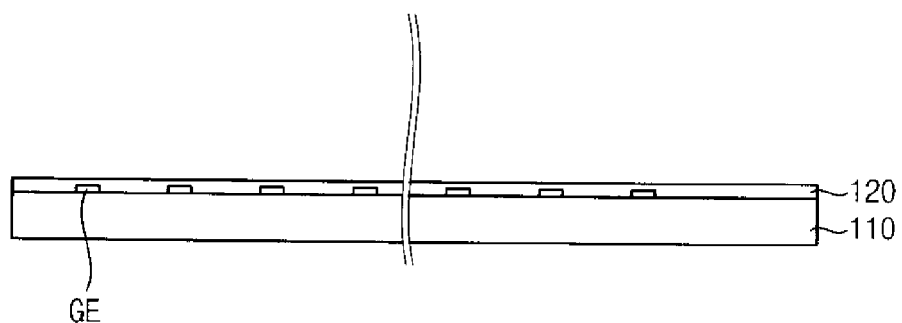
FIG. 3A, FIG. 3B, and FIG. 3C are flow sheets illustrating a method of manufacturing the first substrate of FIG. 1 according to exemplary embodiments of the present invention.
Figure 3B:
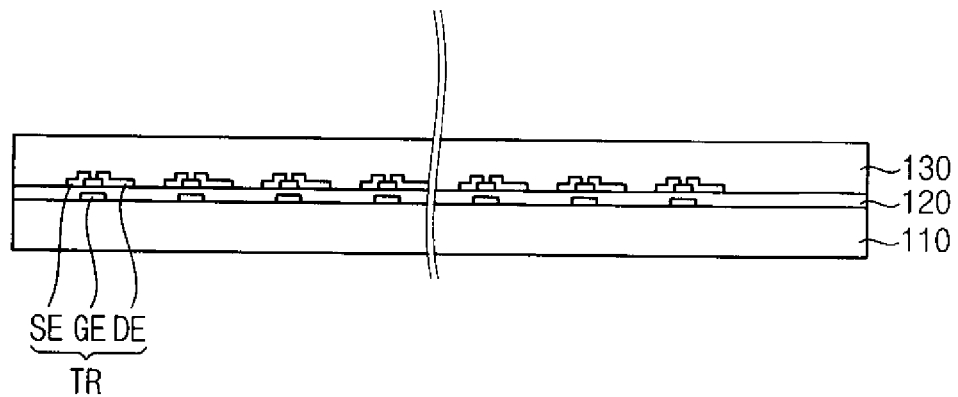
Figure 3C:
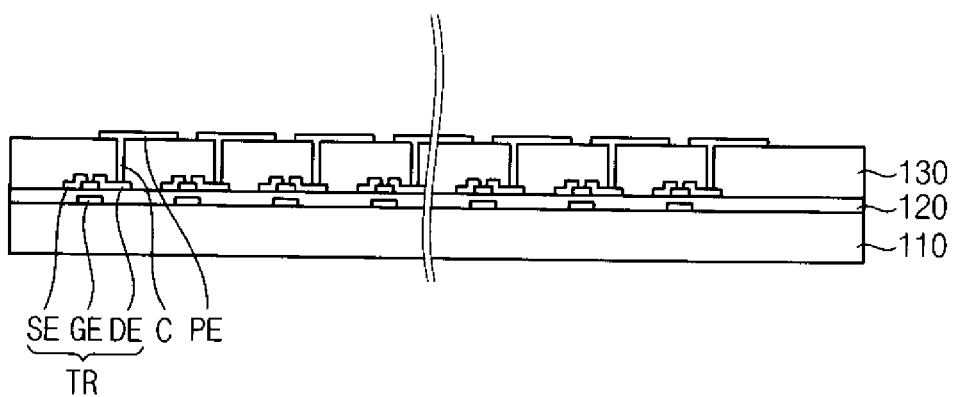

FIG. 3A, FIG. 3B, and FIG. 3C are flow sheets illustrating a method of manufacturing the first substrate of FIG. 1 according to exemplary embodiments of the invention.

Referring to FIGS. 1 and 3A, a gate pattern may be formed on the first base substrate 110. The gate pattern may include the gate lines GL and the gate electrodes GE connected to the gate lines GL. A gate insulating layer 120 may be formed on the first base substrate 110 on which the gate pattern is formed.

Referring to FIG. 1 and FIG. 3B, a plurality of semiconductor patterns may be formed on the first base substrate 110 on which the gate insulating layer 120 is formed. The semiconductor patterns may be formed on the gate electrodes GE. In some cases, the semiconductor patterns may include an amorphous silicon layer and an amorphous silicon layer doped with dopants. In some cases, the semiconductor patterns may include an oxide semiconductor layer. The oxide semiconductor layer may include an amorphous oxide including any suitable material including, for example, at least one of indium (In), zinc (Zn), gallium (Ga), tin (Sn) and hafnium (Hf). In some cases, the semiconductor patterns may include a crystalline silicon layer.

A source pattern may be formed on the first base substrate 110 on which the semiconductor patterns are formed. The source pattern may include the data lines DL, source electrodes SE, and drain electrodes DE. An insulating layer 130 may be formed on the first base substrate 110 and the source pattern. The insulating layer 130 may have a single layer structure or a multiple layer structure. The insulating layer 130 may planarize the first base substrate 110. In general, the insulating layer 130 may be made of any suitable material.

Referring to FIG. 1 and FIG. 3C, a plurality of contact holes C may be formed by etching the insulating layer 130. A transparent electrode pattern may be formed on the first base substrate 110 and in the contact holes C. The transparent electrode pattern may include the pixel electrodes PE. The pixel electrodes PE may be electrically connected to the switching elements TR through the contact holes C.

FIG. 4A, FIG. 4B, FIG. 4C, FIG. 4D, FIG. 4E, and 4F are flow sheets illustrating a method of manufacturing the second substrate 200 of FIG. 1 according to exemplary embodiments of the invention. FIG. 5 is a plan view of the second substrate of FIG. 1.

Figure 4A:
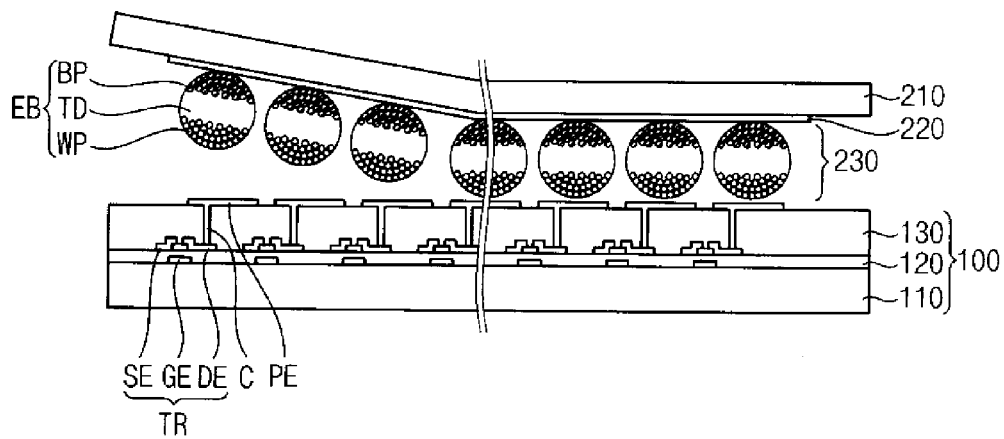
FIG. 4A, FIG. 4B, FIG. 4C, FIG. 4D, FIG. 4E, and FIG. 4F are flow sheets illustrating a method of manufacturing the second substrate of FIG. 1 according to exemplary embodiments of the present invention.
Figure 5:
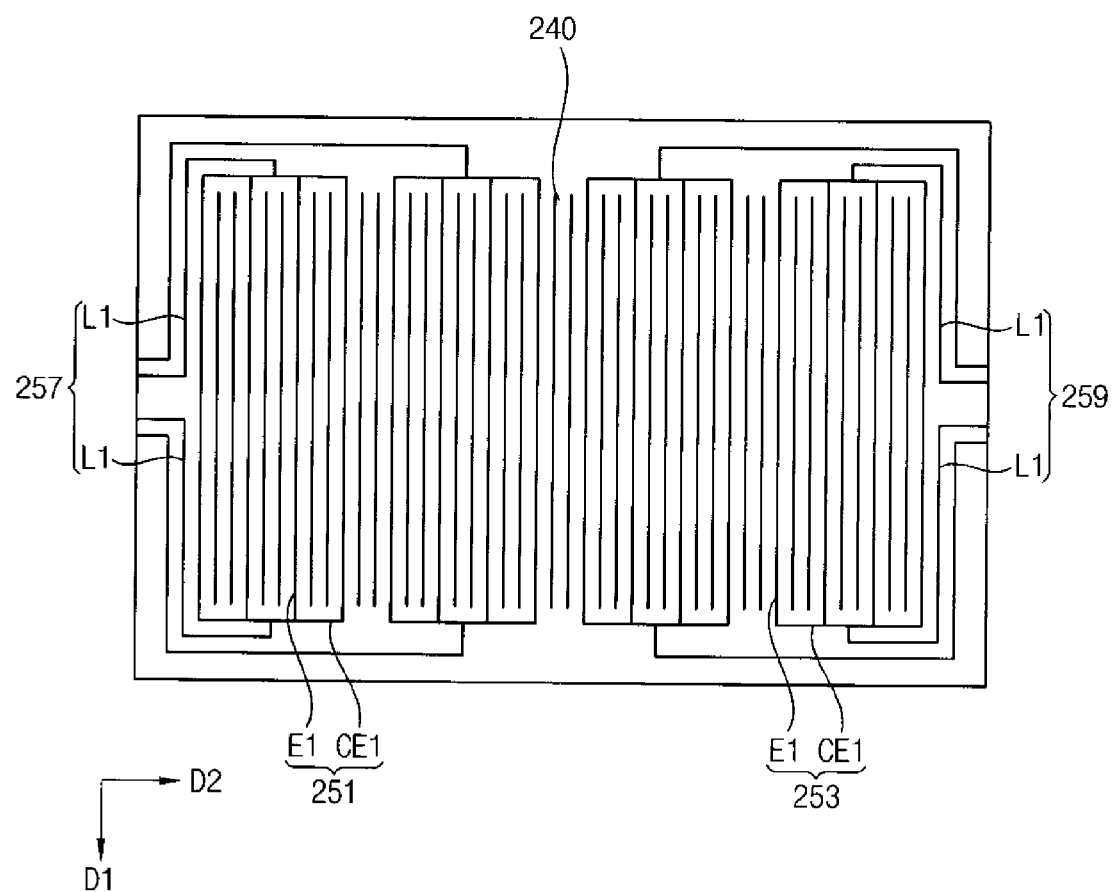
FIG. 5 is a plan view of the second substrate of FIG. 1 according to exemplary embodiments of the present invention.

Referring to FIG. 4A and FIG. 5, the second base substrate 210 may include the common electrode 220, and the electro optical layer 230 may be laminated on the first substrate 100. The second base substrate 210 may include any suitable material including, for example, a flexible plastic material. The common electrode 220 may include any suitable material including, for example, a transparent conductive material. Examples of the transparent conductive material may include indium tin oxide (ITO), indium zinc oxide (IZO), and amorphous indium tin oxide (a-ITO). The electro optical layer 230 may include a white particle WP and a black particle BP. The white particle WP and the black particle BP may be charged with a negative polarity or a positive polarity. The second base substrate 210 may be laminated so that the electro optical layer 230 corresponds to the display area DA of the first substrate 100.

Figure 4B:
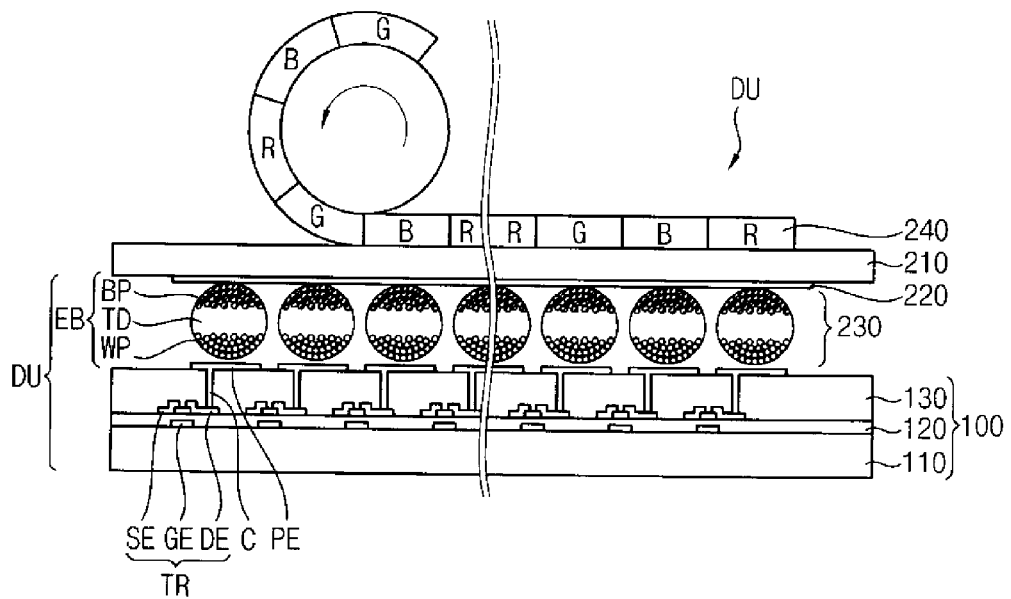

Referring to FIG. 4B and FIG. 5, after laminating the second base substrate 210, the color filter layer 240 may be formed on the second base substrate 210. The color filter layer 240 may include red R, green G, and blue B color filters. Because the second base substrate 210 may include a flexible plastic material, the color filter layer 240 may be formed by a printing method.

Accordingly, the display unit DU can be manufactured using the above-described method.

Thereafter, the touch unit TU can be manufactured as follows. The first touch electrode part 250 may be formed using any suitable method including, for example, a gravure offset printing method on the second face of the second base substrate 210 on which the color filter layer 240 is formed. The manufacturing process of the first touch electrode part 250 will be explained with reference to FIG. 4C, FIG. 4D, and FIG. 4E.

Figure 4C:
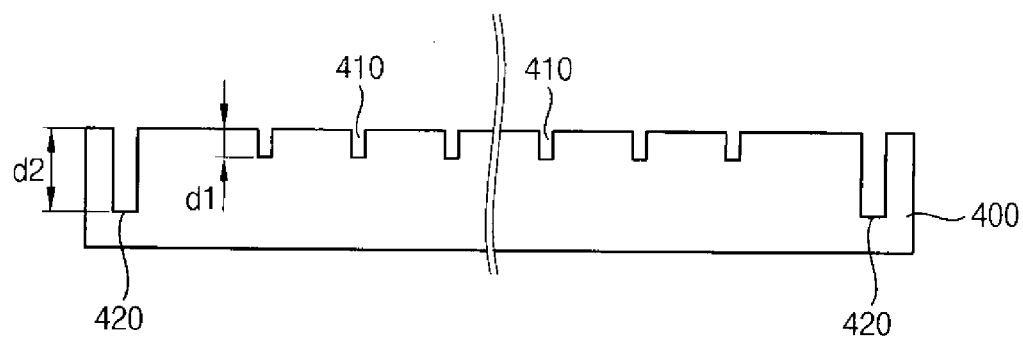

Referring to FIG. 4C and FIG. 5, first and second recess parts 410 and 420 may be formed on a printing substrate 400. The first and second recess parts 410 and 420 may be formed using a photoresist.

The first recess part 410 may be formed on an area of the printing substrate 400 corresponding to the first electrode parts 251 and 253. The second recess part 420 may be formed on an area of the printing substrate 400 corresponding to the first line parts 257 and 259. The first recess part 410 may include recess patterns corresponding to the first electrodes E1 and the first connecting electrodes CE1 that connect ends of at least some of the first electrodes E1 to each other. The second recess part 420 may include recess patterns corresponding to the first lines L1 connected to the first connecting electrodes CE1. The first recess part 410 may have a first depth d1, and the second recess part 420 may have a second depth d2 deeper than the first depth d1. In general, the first recess part 410 and the second recess part 420 may have any suitable depth and the second recess part 420 may have a greater depth than the first recess part 410.

Figure 4D:
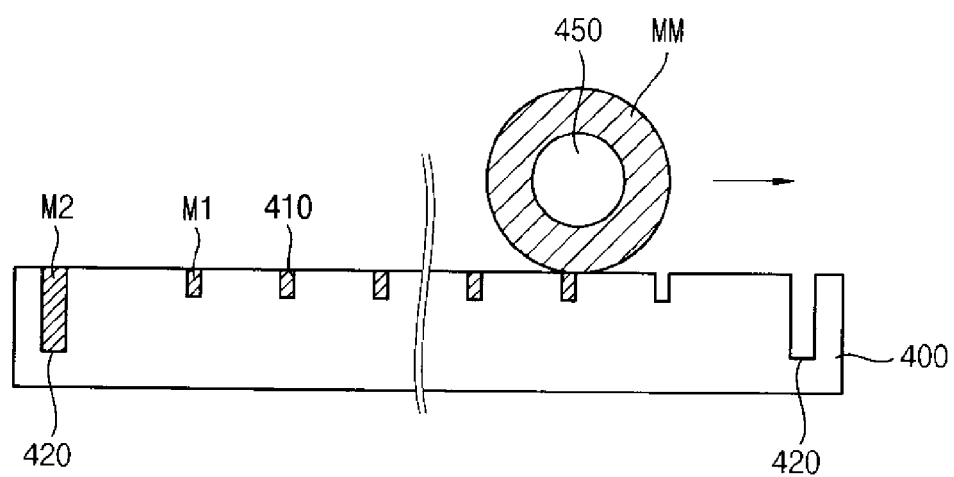

Referring to FIG. 4D and FIG. 5, a roller 450, of which an outer surface is coated with a metallic material MM, may be disposed on the printing substrate 400 on which the first and second recess parts 410 and 420 are formed. The first and second recess parts 410 and 420 of the printing substrate 400 may be filled with the metallic material MM provided from the roller 450 by moving the roller 450 over the printing substrate 400. The metallic material MM may include any suitable material including, for example, silver (Ag).

The metallic material MM filling the first and second recess parts 410 and 420 may correspond to a first metal pattern M1 and second metal pattern M2. The first metal pattern M1 filling the first recess part 410 may correspond to the first electrodes E1 and the first connecting electrodes CE1 of the first electrode parts 251 and 253. The second metal pattern M2 filling the second recess part 420 may correspond to the first lines L1 of the first line parts 257 and 259. Consequently, the first electrode parts 251 and 253 and the first line parts 257 and 259 may be formed of substantially the same material to have different thicknesses by using the first and second recess parts 410 and 420 having different depths.

Figure 4E:
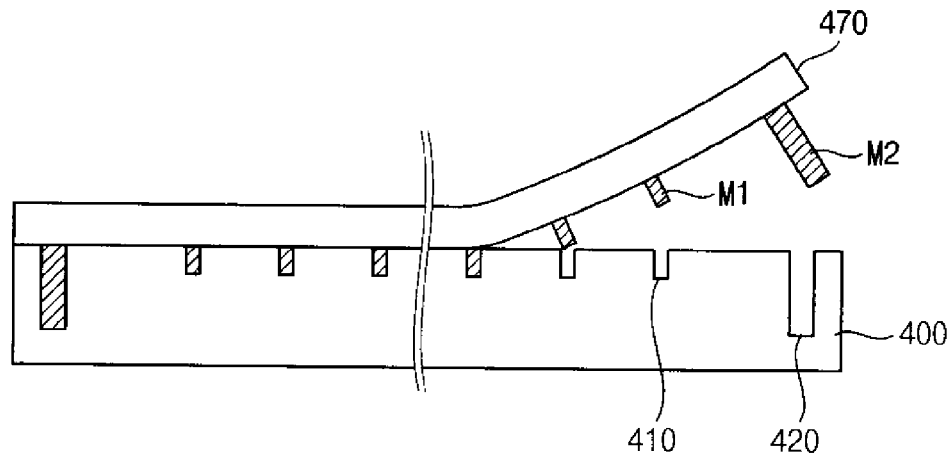

Referring to FIG. 4E and FIG. 5, a blanket 470 may be disposed on the printing substrate 400, in which the first and second recess parts 410 and 420 have been filled with the first and second metal patterns M1 and M2. The first and second metal patterns M1 and M2 may be transferred on the blanket 470 by applying a pressure on the blanket 470.

Figure 4F:
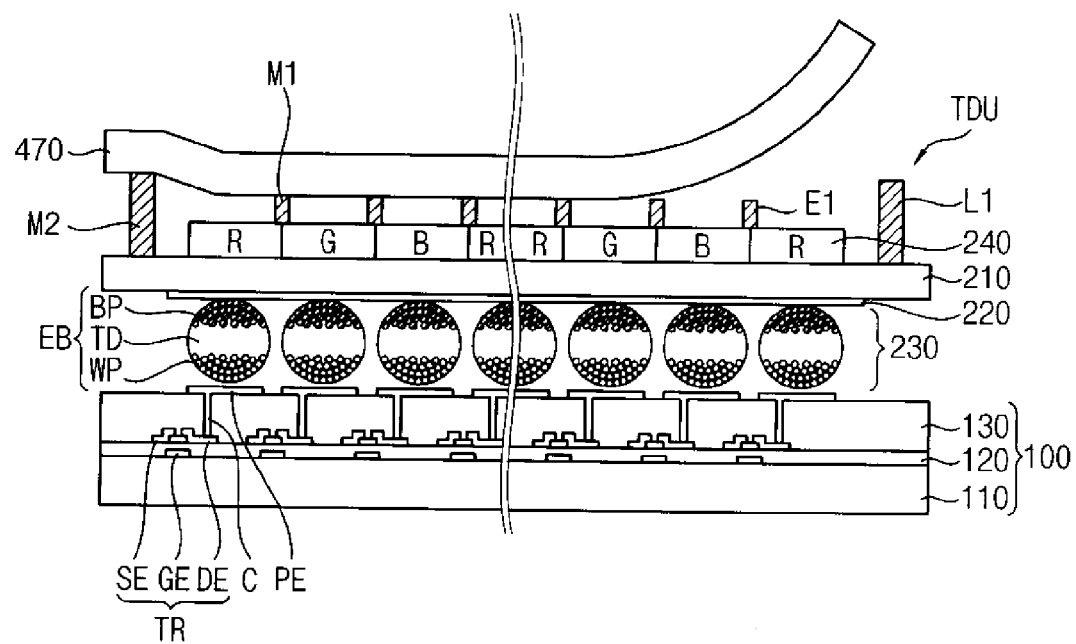

Referring to FIG. 4F and FIG. 5, the blanket 470, including the first and second metal patterns M1 and M2, may be disposed on the display unit DU. The first and second metal patterns M1 and M2 of the blanket 470 may then be transferred on the display unit DU. In particular, the first metal pattern M1 may be transferred on an area of the color filter layer 240 of the second base substrate 210 corresponding to the display area DA, and the second metal pattern M2 may be transferred on an area of the second base substrate 210 corresponding to the peripheral area PA. Accordingly, the first metal pattern M1 becomes the first electrodes E1 and the first connecting electrodes CE1 of the first electrode part 253, and the second metal pattern M2 becomes the first lines L1 of the first line part 259. The first electrodes E1 and the first connecting electrodes CE1 may have a first thickness, and the first lines L1 may have a second thickness thicker than the first thickness. In general, the first electrodes E1, the first connecting electrodes CE1, and the first lines L1 may have any suitable thickness. In addition, a resistance of the first line parts 257 and 259 may be smaller than a resistance of the first electrode parts 251 and 253.

The first electrodes E1 may be disposed on boundary areas of the color filters R, G, and B. For example, the first electrodes E1 may be disposed on a boundary of a blue color filter B and a red color filter R, a red color filter R and a green color filter G, and/or a green color filter G and a blue color filter B. In some cases, the first electrodes E1 may be disposed on a predetermined boundary area of the color filters. For example, the first electrodes E1 may be disposed on at least one of boundary areas of a blue color filter B and a red color filter R, a red color filter R and a green color filter G, and a green color filter G and a blue color filter B. Therefore, lights passing through the color filters may be prevented from being mixed by the first electrodes E1.

Accordingly, the first touch electrode part 250 including the first electrode parts 251 and 253 and the first line parts 257 and 259 may be formed on the display unit DU.

As noted above, the first electrode parts 251 and 253 may extend along the first direction D1. The first electrode part 253 may include a plurality of the first electrodes E1 disposed on a boundary area of neighboring color filters having different colors. The first electrode part 253 may also include the first connecting electrodes CE1 connecting ends of the first electrodes E1 to each other. As a result, colored lights passing through neighboring color filters can be prevented from being mixed by the first electrodes E1. The first electrodes E1 may effectively function as a light blocking pattern (for example, a black matrix BM).

The first line parts 257 and 259 may be electrically connected to the first electrode parts 251 and 253 to electrically connect the first electrode parts 251 and 253 to an external device. The first line part 259 may include the first lines L1 connected to each of the first connecting electrodes CE1 of the first electrode part 253.

The first substrate 100 and the second substrate 200 may be combined by the above mentioned processes to form a touch display unit TDU.

Figure 6A:
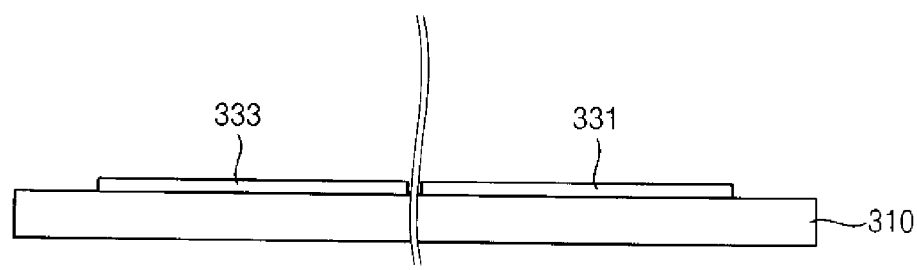
FIGS. 6A and 6B are flow sheets illustrating a method of manufacturing the third substrate of FIG. 1 according to exemplary embodiments of the present invention.
Figure 6B:
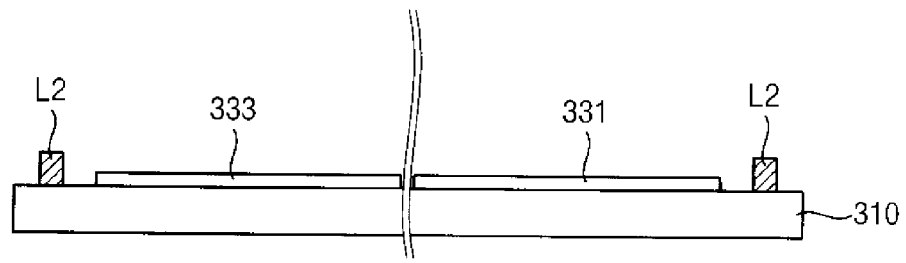
Figure 7:
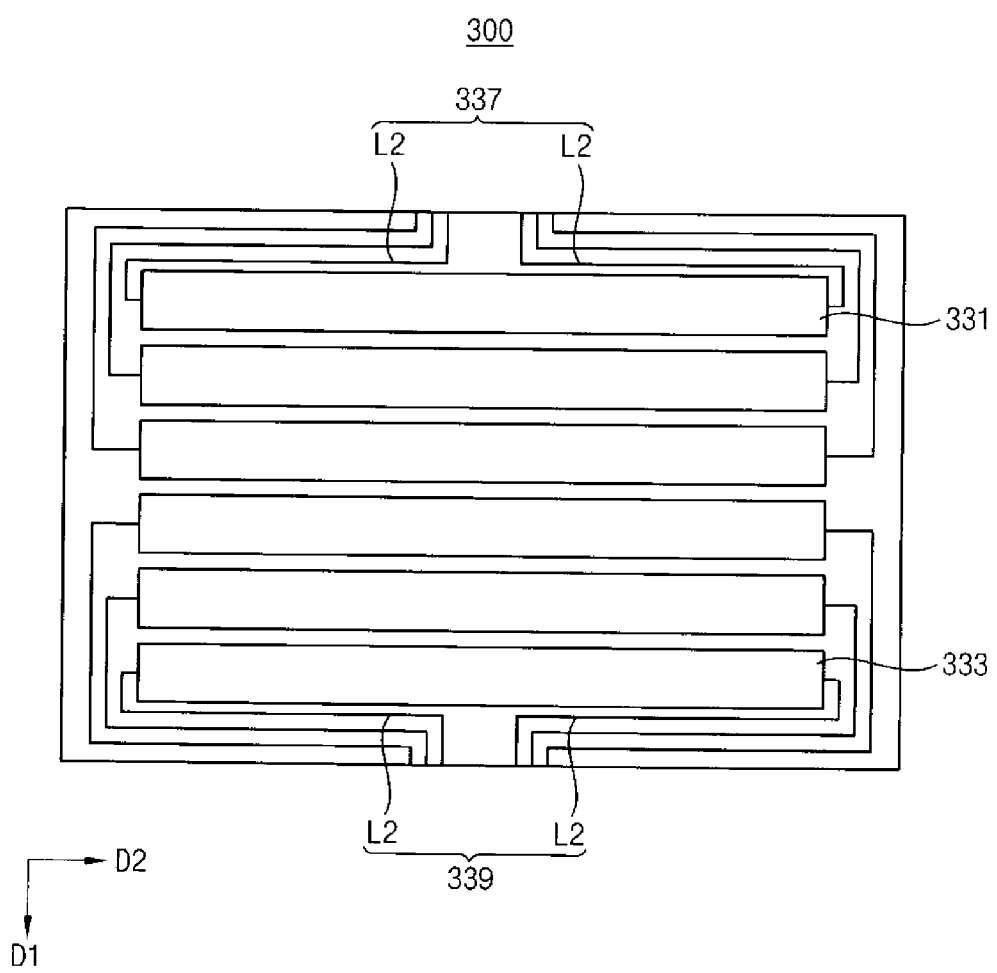
FIG. 7 is a plan view of the third substrate of FIG. 1 according to exemplary embodiments of the present invention.

FIG. 6A and FIG. 6B are flow sheets illustrating a method of manufacturing the third substrate in FIG. 1 according to exemplary embodiments of the invention. FIG. 7 is a plan view of the third substrate of FIG. 1.

Referring to FIG. 6A and FIG. 7, the second electrode parts 331 and 333 may be formed on a third base substrate 310 using any suitable material including, for example, transparent material. The second electrode parts 331 and 333 may extend along the second direction D2. The second electrode parts 331 and 333 may be disposed on an area of the third base substrate 310 corresponding to the display area DA.

Referring to FIG. 6B and FIG. 7, the second line parts 337 and 339 may be formed on a third base substrate 310 on which the second electrode parts 331 and 333 are formed.

The second line parts 337 and 339 may be formed by a gravure offset printing method similar to the gravure offset printing method described with reference to FIG. 4C, FIG. 4D, and FIG. 4E. The second line parts 337 and 339 may be disposed on an area of the third base substrate 310 corresponding to the peripheral area PA. The second line parts 337 and 339 may be electrically connected to the second electrode parts 331 and 333 to electrically connect the second electrode parts 331 and 333 to an external device. The second line parts 337 and 339 may include second lines L2 connected to each end of the second electrode parts 331 and 333.

A second touch electrode part 330 may include a plurality of the second electrode parts 331 and 333, and a plurality of the second line parts 337 and 339 may be formed on the third base substrate 310.

Figure 8:
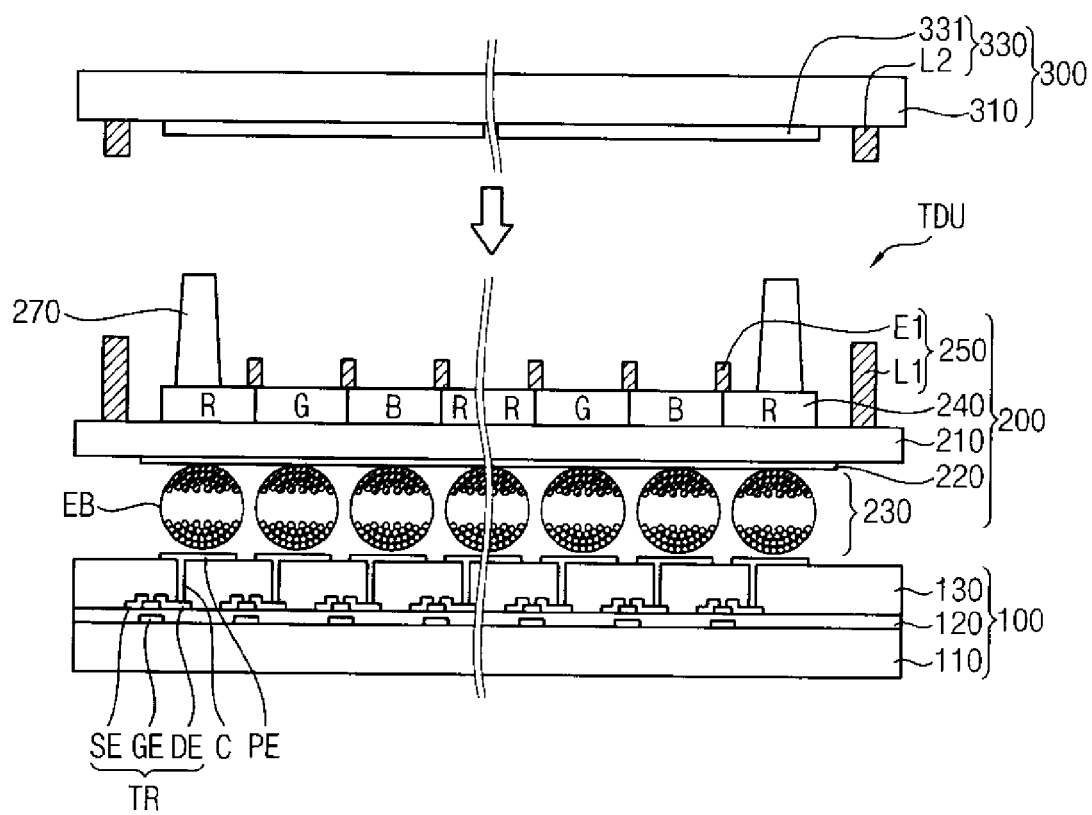
FIG. 8 is a flow sheet illustrating a method of manufacturing the touch display panel of FIG. 1 according to exemplary embodiments of the present invention.

FIG. 8 is a flow sheet illustrating a method of manufacturing the touch display panel of FIG. 1.

Referring to FIG. 8, the spacers 270 for maintaining a gap between the second substrate 200 and the third substrate 300 may be formed in the touch display unit TDU. The touch display unit TDU and the third substrate 300 may be combined. Thus, the touch unit TU can be arranged on the display unit DU to complete the touch display panel TDU. When a pressure, for example, by touching the third substrate 300, is applied to the third substrate 300 of the touch display panel TDU, a touch position may be sensed by a resistive type method through the first electrode E1 contacting with the second electrode part corresponding to the touch position.

According to exemplary embodiments of the present invention described hereinabove, a touch display panel may include three substrates thereby reducing the number of substrates generally used in a touch display panel. In addition, the first electrodes E1, used as touch electrodes, may be disposed on a boundary area of neighboring color filters having different colors from each other, and may function as a light blocking pattern preventing the mixing of colored light, so that a display quality is enhanced without forming an extra light blocking pattern.

Touch Display Panel

Hereinafter, a touch display panel will be described according to exemplary embodiments of the present invention. The same reference numerals will be used to refer to the same or like parts illustrated in FIG. 1, FIG. 2, FIG. 3A, FIG. 3B, FIG. 3C, FIG. 4A, FIG. 4B, FIG. 4C, FIG. 4D, FIG. 4E, FIG. 4F, FIG. 5, FIG. 6A, FIG. 6B, FIG. 7, and FIG. 8, and any repetitive explanation concerning the above elements will be omitted or briefly described.

Figure 9:
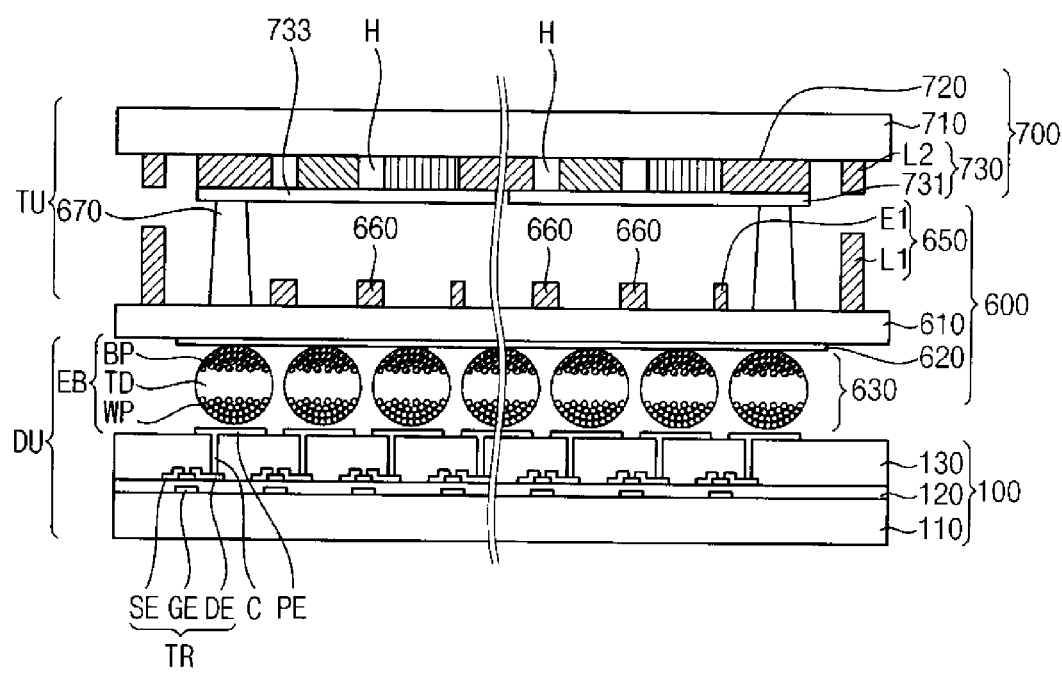
FIG. 9 is a cross-sectional view illustrating a touch display panel according to exemplary embodiments of the present invention.
Figure 10:
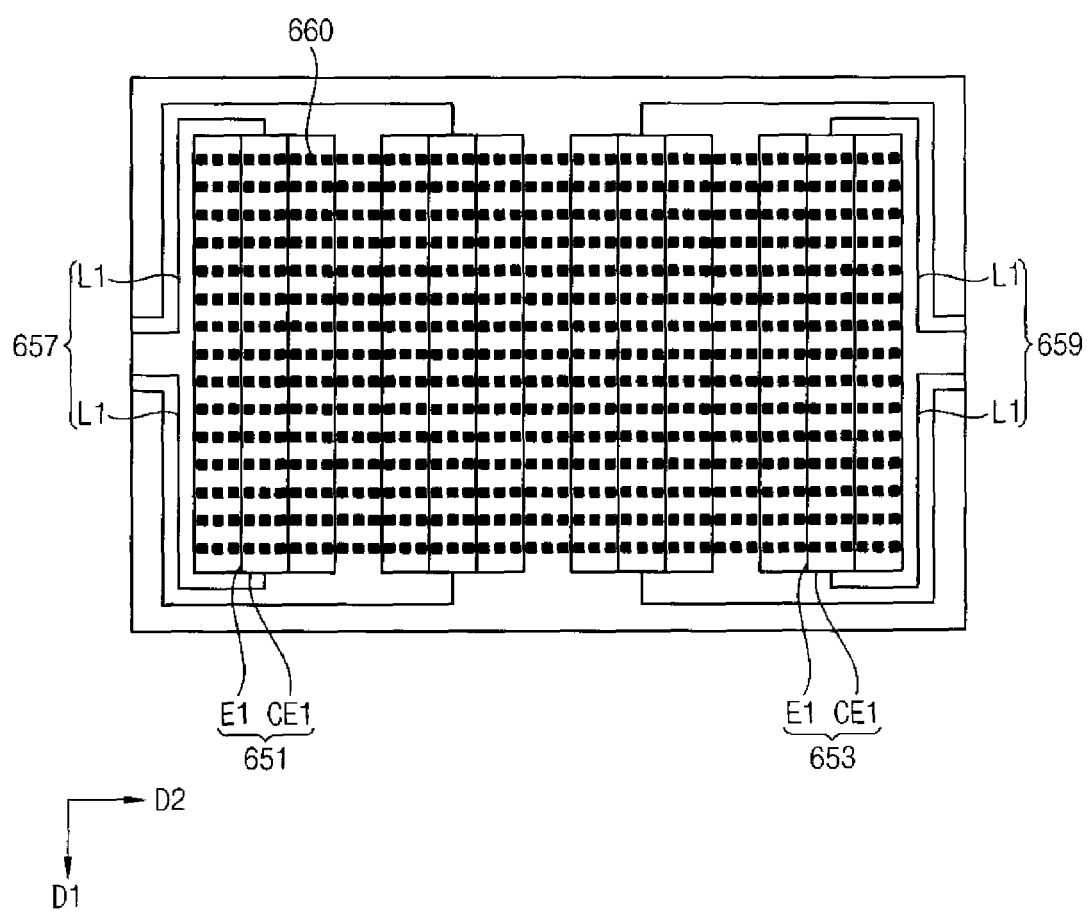
FIG. 10 is a plan view of the second substrate of FIG. 9 according to exemplary embodiments of the present invention.
Figure 11:
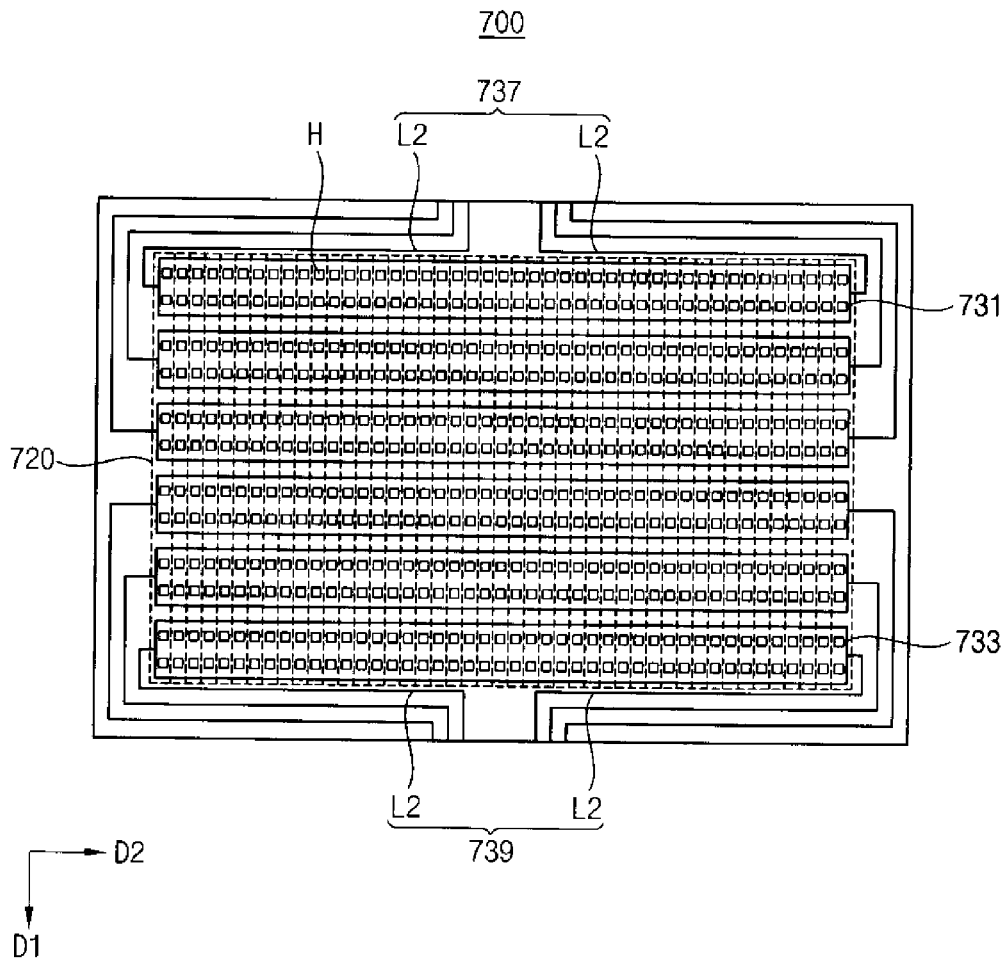
FIG. 11 is a plan view of the third substrate of FIG. 9 according to exemplary embodiments of the present invention.

FIG. 9 is a cross-sectional view illustrating a touch display panel according to exemplary embodiments of the present invention. FIG. 10 is a plan view of the second substrate in FIG. 9. FIG. 11 is a plan view of the third substrate in FIG. 9.

Referring to FIG. 9, the touch display panel may include a first substrate 100, a second substrate 600, and a third substrate 700.

The first substrate 100 is similar to the first substrate 100 described above with reference to FIG. 1 and FIG. 2, therefore a detailed description of the first substrate 100 in FIG. 9 shall be omitted. In general, the first substrate 100 may include a first base substrate 110, a plurality of data lines DL, a plurality of gate lines GL, a plurality of switching elements TR, and a plurality of pixel electrodes PE. The first base substrate 110 may include a display area DA including a plurality of pixel areas and a peripheral area PA surrounding the display area DA.

Referring to FIG. 9 and FIG. 10, the second substrate 600 may include a second base substrate 610, a common electrode 620, an electro optical layer 630, a first touch electrode part 650, a plurality of reflecting plates 660, and a plurality of spacers 670.

The second base substrate 610 may be made of any suitable material including, for example, a flexible plastic material such as polyethylene terephthalate (PET). The second base substrate 610 may have a first face facing the first substrate and a second face facing the third substrate.

The common electrode 620 and the electro optical layer 630 may be disposed on the first face of the second base substrate 610. The common electrode 620 may face the pixel electrodes PE. The electro optical layer 630 may be an electrophoretic layer including negative charged and positive charged electrophoretic particles, as described above.

The electro optical layer 630 may include a plurality of electrophoretic balls EB and a binder (not shown) combining the electrophoretic balls EB. Each of the electrophoretic balls EB may include negative charged and positive charged electrophoretic particles. For example, the electrophoretic ball EB may include a transparent dielectric TD, a white particle WP charged with a positive or a negative charge, and a black particle BP charged with an opposite polarity to the charge of the white particle WP. The electro optical layer 630 may be disposed between the common electrode 620 and the pixel electrodes PE, and may display a gray scale by arranging the white particle WP and the black particle BP in response to an electric field between the common electrode 620 and the pixel electrodes PE.

The first touch electrode part 650 may include a plurality of first electrode parts 651 and 653 and a plurality of first line parts 657 and 659. The first electrode parts 651 and 653 may extend along the first direction D1 and may be disposed on the second face of the second base substrate 610 corresponding to the display area DA. Each of the first electrode parts 651 and 653 may include a plurality of first electrodes E1 disposed at a location corresponding to or opposite of a boundary area of neighboring color filters having different colors. The plurality of first connecting electrodes CE1 may connect each end of the first electrodes E1. The first electrodes E1 may have any suitable shape including, for example a bar shape or a line shape, and may extend along the first direction D1. The first connecting electrodes CE1 may extend along the second direction D2, and may connect ends of the first electrodes E1.

The first line parts 657 and 659 may be disposed on an area of the second base substrate 610 corresponding to the peripheral area PA. The first line parts 657 and 659 may be electrically connected to the first electrode parts 651 and 653 to electrically connect the first electrode parts 651 and 653 to an external device. Each of the first line parts 657 and 659 may include first lines L1 connected to each of the first connecting electrodes CE1 of the first electrode parts 651 and 653.

The reflecting plates 660 may be formed using any suitable material including, for example, a metallic material substantially the same as the first touch electrode part 250 described above. The method to form the first touch electrode part 650 may be substantially the same as described above with reference to FIG. 4C, FIG. 4D, FIG. 4E, and FIG. 4F. Each of the reflecting plates 660 may be disposed on areas of the second face of the second base substrate 610 corresponding to the pixel areas on which the pixel electrodes PE are formed. In some cases, the reflecting plates 660 may be arranged to correspond one-to-one to the pixel areas on which the pixel electrodes PE are formed. In some cases, the reflecting plates 660 may be arranged to correspond to predetermined pixel areas. In general, the reflecting plates 660 may be arranged in various manners, and are not limited to the arrangements noted above. The reflecting plates 660 may reflect an external light to maximize efficiency of the external light.

The spacers 670 may be disposed on the second substrate 600, and may maintain a gap between the second substrate 600 and the third substrate 700.

Referring to FIG. 9 and FIG. 11, the third substrate 700 may include a third base substrate 710, a color filter layer 720, and a second touch electrode part 730.

The third base substrate 710 may be made of any suitable material including, for example, glass or plastic.

The color filter layer 720 may include red R, green G, and blue B color filters. Each of the color filters R, G and B may include a light hole H. The light holes H may be formed on the third base substrate 710 and may correspond to each of the reflecting plates 660 on the second base substrate 610. For example, in some cases, the light holes H may be located at a location corresponding to the location of the reflecting plates 660 on the second base substrate 610. In some cases, the light holes H may have approximately the same shape and/or size as the reflecting plates 660. External light incidents through the light hole H and the incident external light may be reflected from the reflecting plates 660, so that an efficiency of the external light is maximized. The first electrodes E1 may be disposed on the second substrate 600 corresponding to boundary areas of the color filters R, G, and B in the third substrate 700. For example, the first electrodes E1 may be disposed at a location on the second substrate 600 that is the opposite of boundary areas of the blue color filter B and the red color filter R, the red color filter R and green color filter G, and/or the green color filter G and the blue color filter B on the third substrate 700. In some cases, the first electrodes E1 may be disposed at predetermined locations. For example, the first electrodes E1 may be disposed on at least one of locations on the second substrate 600 that are the opposite of the boundary areas of the blue color filter B and the red color filter R, the red color filter R and the green color filter G, and the green color filter G and th blue color filter B. In general, the first electrodes E1 may be disposed on any suitable part of the second substrate 600.

The second touch electrode part 730 may include a plurality of second electrode parts 731 and 733 and a plurality of second line parts 737 and 739. The second electrode parts 731 and 733 may extend along the second direction D2 and may be disposed on an area of the third base substrate 710 corresponding to the display area DA. The second line parts 737 and 739 may be disposed on an area of the third base substrate 710 corresponding to the peripheral area PA. The second line parts 737 and 739 may be electrically connected to the second electrode parts 731 and 733 to electrically connect the second electrode parts 731 and 733 to an external device. Each of the second line parts 737 and 739 may include second lines L2 connected to each of the second electrode parts 731 and 733.

Figure 12A:
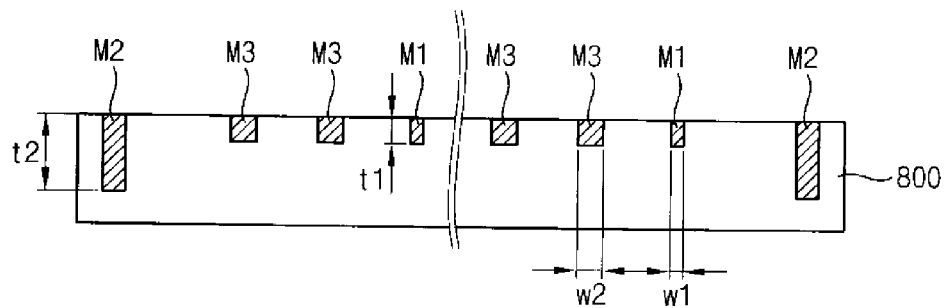
FIG. 12A, FIG. 12B, and FIG. 12C are flow sheets illustrating a method of manufacturing process the first substrate and the second substrate of FIG. 9 according to exemplary embodiments of the present invention.
Figure 12B:
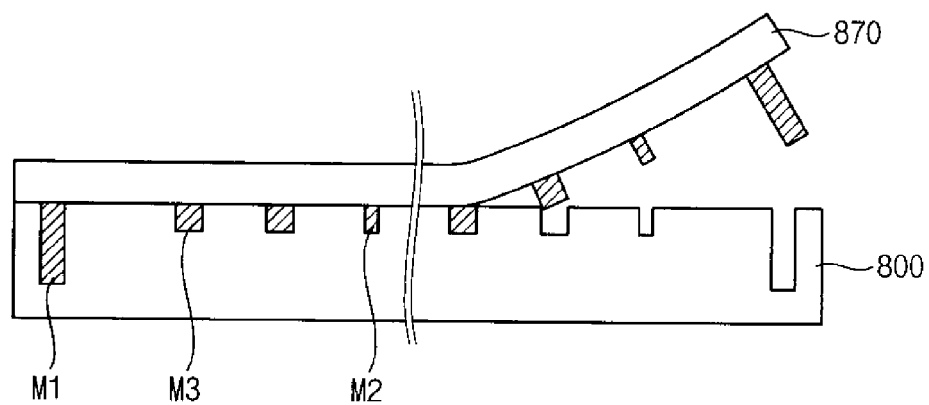
Figure 12C:
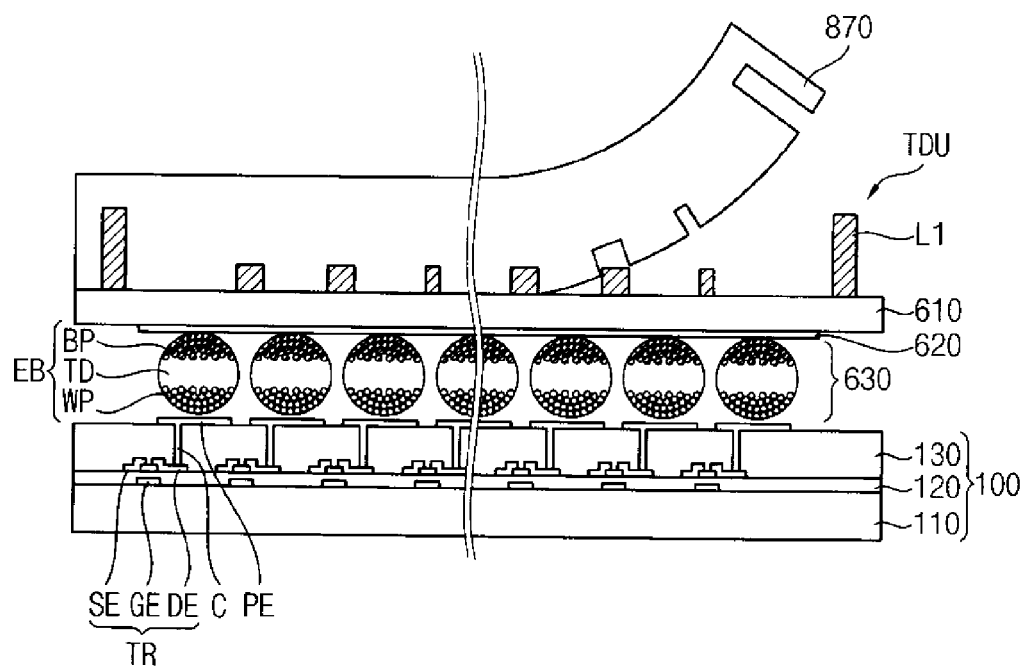

FIG. 12A, FIG. 12B, and FIG. 12C are flow sheets illustrating a method of manufacturing the first substrate and the second substrate of FIG. 9.

Referring to FIG. 10 and FIG. 12A, the first substrate 100 may be formed by a method substantially the same as the method of manufacturing the first play substrate 100 described with reference to FIG. 3A, FIG. 3B, and FIG. 3C. The second base substrate 610 including the common electrode 620 and the electro optical layer 630 may be laminated on the first base substrate to complete a display unit DU. The first touch electrode part 650 may be formed on the second base substrate 610 of the display unit DU by using a gravure offset printing method described above.

For example, first, second, and third recess parts may be filed with first, second, and third metal patterns M1, M2 and M3 by using the gravure offset printing method. The first metal pattern M1 may correspond to the first electrodes E1 and the first connecting electrodes CE1 of the first electrode parts 651 and 653. The second metal pattern M2 may correspond to the first lines L1 of the first line part 657 and 659. The third metal pattern M3 may correspond to reflecting plates 660. The first metal pattern M1, the second metal pattern M2, and the third metal pattern M3 may have thicknesses (e.g., depth) t1, t2, and t3, respectively. In some cases, the thickness t2 may be thicker than thickness t1 and t3. In some cases, thicknesses t1 and t3 may be approximately the same thickness. In some cases, a width w2 of the third metal pattern M3 may be wider than a width w1 of the first metal pattern M1. In general, any suitable combination of thicknesses and widths may be used.

Referring to FIG. 10 and FIG. 12B, a blanket 870 may be disposed on the printing substrate 800 on which the first, second, and third metal patterns M1, M2, and M3 are formed. The first, second, and third metal patterns M1, M2 and M3 may be transferred on the blanket 870 by applying a pressure on a whole of the blanket 870.

Referring to FIG. 10 and FIG. 12C, the blanket 870 on which the first, second, and third metal patterns M1, M2, and M3 have been transferred, may be disposed on the display unit DU thereby transferring the first, second, and third metal patterns M1, M2, and M3 of the blanket 870 on the display unit DU. The first and third metal patterns M1 and M3 may be formed on an area of the second base substrate 610 corresponding to the display area DA. The second metal pattern M2 may be formed on an area of the second base substrate 610 corresponding to the peripheral area PA. Thus, the first metal patterns M1 may be the first electrodes E1 and the first connecting electrodes CE1 of the first electrode part 653, the second metal patterns M2 may be the first lines L1 of the first line part 659, and the third metal patterns M3 may be the reflecting plates 660. In some cases, the first electrodes E1 and the first connecting electrodes CE1 may have a first thickness, and the first lines L1 may have a second thickness thicker than the first thickness.

As a result of the foregoing process, the first touch electrode part 650 including the first electrode parts 651 and 653 and the first line parts 657 and 659 may be formed on the second base substrate 610. The first electrode parts 651 and 653 may extend along the first direction D1, and may be disposed on an area of the second base substrate 610 corresponding to the display area DA. The first electrode parts 651 and 653 may include a plurality of the first electrodes E1 disposed in a location corresponding to a boundary area of neighboring color filters having different colors and the first connecting electrodes CE1 connecting each end of a portion of the first electrodes E1.

The first line parts 657 and 659 may be disposed on an area of the second base substrate 610 corresponding to the peripheral area PA. The first line parts 657 and 659 may be electrically connected to the first electrode parts 651 and 653 to electrically connect the first electrode parts 651 and 653 to an external device. Each of the first line parts 659 and 653 may include the first lines L1 connected to each of the first connecting electrodes CE1 of the first electrode part 253.

Each of the reflecting plates 660 may be disposed on an area of the second base substrate 610 corresponding to the pixel areas in which the pixel electrode PE are formed. The reflecting plates 660 may be arranged to correspond one-to-one to the pixel areas on which the pixel electrodes PE are formed. In some cases, the reflecting plates 660 may be arranged to correspond to predetermined pixel areas. The reflecting plates 660 may reflect an external light to maximize an efficiency of the external light.

The first substrate 100 and the second substrate 200 may be combined to form a combined touch display unit TDU using the above-described method.

Figure 13A:
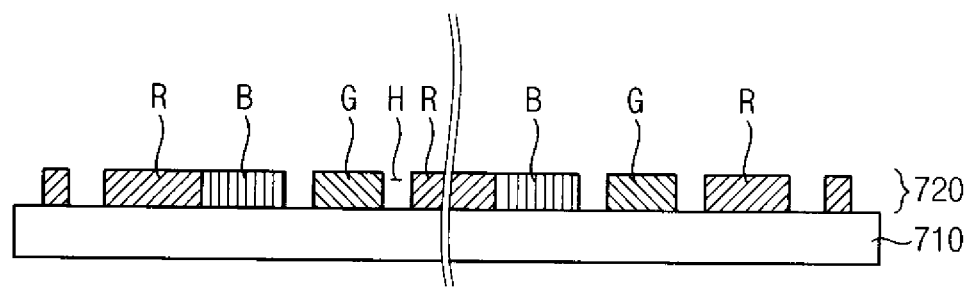
FIG. 13A and FIG. 13B are flow sheets illustrating a method of manufacturing the third substrate of FIG. 9 according to exemplary embodiments of the present invention.
Figure 13B:
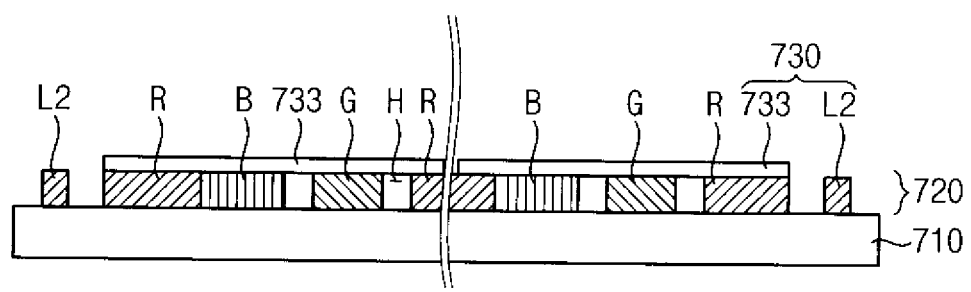

FIG. 13A and FIG. 13B are flow sheets illustrating a method of manufacturing the third substrate of FIG. 9.

Referring to FIG. 11 and FIG. 13A, the color filter layer 720 may be formed on a third base substrate 710 using a printing method. The color filter layer 720 may include red R, green G, and blue B color filters. Each of the color filters may include a light hole formed by removing a portion of the color filter corresponding to locations of the reflecting plates 660.

Referring to FIG. 11 and FIG. 13B, the second electrode parts 731 and 733 may be formed on a third base substrate 710 on which the color filter layer 720. The second electrode parts 731 and 733 may be formed using any suitable material including, for example, transparent material. The second electrode parts 731 and 733 may extend along the second direction D2 and may be disposed on an area of the third base substrate 710 corresponding to the display area DA.

Thereafter, the second line parts 737 and 739 may be formed by a gravure offset printing method. The second line parts 737 and 739 may be formed on an area of the third base substrate 710 corresponding to the peripheral area PA. The second line parts 737 and 739 may be electrically connected to the second electrode parts 731 and 733 to electrically connect the second electrode parts 731 and 733 to an external device. Each of the second line parts 737 and 739 may include second lines L2 connected to each end of the second electrode parts 731 and 733.

A second touch electrode part 730 may include a plurality of the second electrode parts 731 and 733, and a plurality of the second line parts 737 and 739 may be formed on the third base substrate 710.

Figure 14:
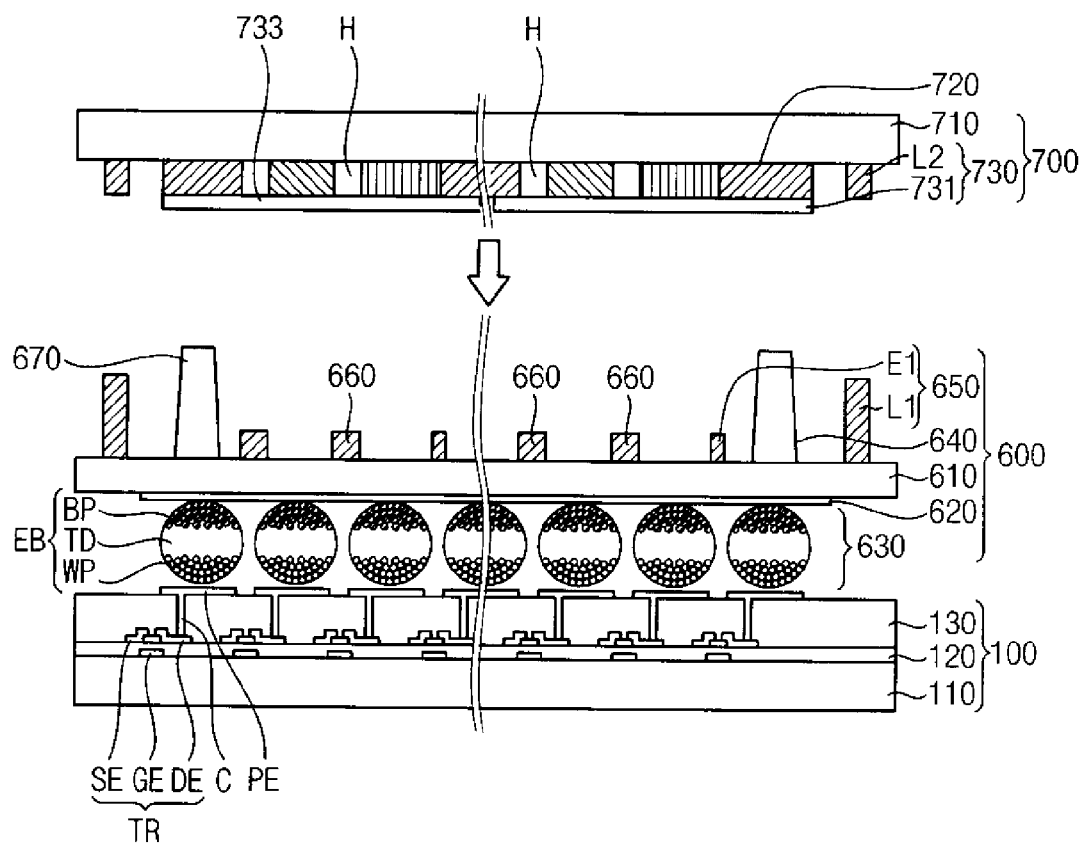
FIG. 14 is a flow sheet illustrating a method of manufacturing the touch display panel of FIG. 9 according to exemplary embodiments of the present invention.

FIG. 14 is a flow sheet illustrating a method of manufacturing the touch display panel of FIG. 9.

Referring to FIG. 14, the spacers 670 may be formed on the touch display unit TDU to maintain a gap between the second substrate 600 and the third substrate 700. The touch display unit TDU (on which the spacers 670 are formed) and the third substrate 700 may be combined. Accordingly, the touch unit TU may be arranged on the display unit DU to complete the touch display panel.

According to exemplary embodiments of the invention, the touch display panel may include three substrates to reduce the number of substrates generally used in a touch display panel. In addition, a light hole H can be formed through a color filter, and a reflecting plate 660 corresponding to the light hole H can be formed using a metallic material that is substantially the same as the material used to form the first electrodes E1 used as a touch electrode, so that a display quality is enhanced as a result of enhancing an optical efficiency of external light.

The foregoing is illustrative of the present invention and is not to be construed as limiting thereof. Although exemplary embodiments of the present invention have been described, those skilled in the art will readily appreciate that many modifications of the exemplary embodiments can be implemented without materially departing from the novel teachings and advantages of the exemplary embodiments of the present invention. Accordingly, all such modifications are intended to be included within the scope of the present invention.

What is claimed is:

1. A touch display panel, comprising:
 a display unit comprising:
  a first base substrate comprising a plurality of pixel electrodes;
  a second base substrate comprising a common electrode disposed on a first face of the second base substrate, the first face facing the first base substrate; and
  an electrophoretic layer disposed between the pixel electrodes and the common electrode, the electrophoretic layer comprising a plurality of electrophoretic balls; and
 a touch unit comprising:
  a color filter layer comprising a plurality of color filters;
  a first electrode part comprising first electrodes and first connecting electrodes on a second face of the second base substrate, the first electrodes being light blocking electrodes on a display area of the display unit being located at a boundary between a first color filter and a second color filter, the second color filter being different from the first color filter in color, the first connecting electrodes electrically connecting end portions of the first electrodes on the display area;
  a first line electrode disposed on a peripheral area of the display unit adjacent to the display area, the first line electrode being electrically connected to one of the first connecting electrodes, the first line electrode being thicker than the first electrodes; and
  a third base substrate comprising a second electrode part extending along a direction crossing the first electrodes,
 wherein the first electrodes, the first connecting electrodes and the first line electrode comprise a same material as each other.

2. The touch display panel of claim 1, wherein the color filter layer is disposed on the second face of the second base substrate, and the first electrode part is disposed on the color filter layer.

3. The touch display panel of claim 1, wherein the color filter layer is disposed on the third base substrate, and the second electrode part is disposed on the color filter layer.

4. The touch display panel of claim 3, wherein the color filter layer comprises a light hole.

5. The touch display panel of claim 4, wherein the touch unit further comprises a reflecting plate disposed on the second face of the second base substrate, the reflecting plate being located in an area corresponding to a location of the light hole, the reflecting plate comprising a metallic material that is substantially the same type of material as a material forming the first electrode part.

6. A method of manufacturing a touch display panel, the method comprising:
forming a first substrate comprising a plurality of pixel electrodes formed on a first base substrate;
disposing a second base substrate on the first substrate, the second base substrate comprising a common electrode and an electrophoretic layer, the electrophoretic layer being formed on a first face of the second base substrate, the electrophoretic layer comprising a plurality of electrophoretic balls;
forming a color filter layer comprising a plurality of color filters on a second face of the second base substrate;
simultaneously forming a first electrode, a first connecting electrode and a first line electrode on the second face of the second base substrate, the first electrode being a light blocking electrode on a display area and being located at a boundary between a first color filter and a second color filter, the second color filter being different from the first color filter in color, the first connecting electrode electrically connecting end portions of the first electrode on the display area, the first line electrode being electrically connected to the first connecting electrode, the first line electrode being disposed on a peripheral area adjacent to the display area, the first line electrode being thicker than the first electrode;
forming a third substrate comprising a second electrode extending along a direction crossing the first electrode and a second line electrode electrically connected to the second electrode; and
combining the second base substrate with the third substrate such that the first electrode faces the second electrode.

7. The method of claim 6, wherein simultaneously forming the first electrode, the first connecting electrode, and the first line electrode further comprises:
forming a first recess part and a second recess part having different depths from each other on a printing substrate;
filling the first recess part and the second recess part of the printing substrate with a metallic material to form a first metal pattern and a second metal pattern, respectively;
transferring the first metal pattern and the second metal pattern on a blanket; and
transferring the first metal pattern and the second metal pattern from the blanket to the second face of the second base substrate to form the first electrode, the first connecting electrode and the first line electrode.

8. The method of claim 7, wherein forming the third substrate further comprises:
forming the second electrode on the third substrate using a transparent conductive material; and
forming the second line electrode on the third base substrate comprising the second electrode using a metallic material.

9. The method of claim 6, wherein the color filter layer is formed by a printing method.

10. The method of claim 6, further comprising spreading a plurality of spacers on the second face of the second base substrate.

11. A method of manufacturing a touch display panel, the method comprising:
forming a first substrate comprising a plurality of pixel electrodes formed on a first base substrate;
disposing a second base substrate on the first substrate, the second base substrate comprising a common electrode and an electrophoretic layer, the electrophoretic layer being formed on a first face of the second base substrate, the electrophoretic layer comprising a plurality of electrophoretic balls;
forming a third base substrate comprising a second electrode, a second line electrode and a color filter layer, the second line electrode being electrically connected to the second electrode, the color filter layer comprising a plurality of color filters;
simultaneously forming a first electrode, a first connecting electrode, a first line electrode, and a reflecting plate on a second face of the second base substrate, the first electrode being a light blocking electrode on a display area and being located at a boundary between a first color filter and a second color filter, the second color filter being different from the first color filter in color, the first electrode extending along a direction crossing the second electrode, the first connecting electrode electrically connecting end portions of the first electrode on the display area, the first line electrode being electrically connected to the first connecting electrode, the first line electrode being disposed on a peripheral area adjacent to the display area, the first line electrode being thicker than the first electrode; and
combining the second base substrate with the third substrate such that the first electrode part faces the second electrode part.

12. The method of claim 11, wherein forming the third substrate further comprises:
forming the color filter layer on the third base substrate by a printing method;
forming the second electrode on the third base substrate using a transparent conductive material; and
forming the second line electrode on the third base substrate by a printing method.

13. The method of claim 12, wherein the color filter layer comprises a light hole corresponding to the reflecting plate.

14. The method of claim 12, wherein simultaneously forming the first electrode, the first connecting electrode, the first line electrode, and the reflecting plate further comprises:
forming a first recess part, a second recess part, and a third recess part on a printing substrate, the first recess part and the third recess part having a different depth from the second recess part;
filling the first recess part, the second recess part, and the third recess part of the printing substrate with a metallic material to form a first metal pattern, a second metal pattern and a third metal pattern, respectively;
transferring the first metal pattern, the second metal pattern and the third metal pattern to a blanket; and
transferring the first metal pattern, the second metal pattern, and the third metal pattern from the blanket to the second face of the second base substrate to form the first electrode, the first connecting electrode, the first line electrode and the reflecting plate.

15. The method of claim 11, further comprising forming a plurality of spacers on the second face of the second base substrate.

16. A touch display panel, comprising:
- a display unit comprising a first substrate and at least a first portion of a second substrate, the display unit configured to display an image; and
- a touch unit comprising a third substrate, at least a second portion of the second substrate, a first touch electrode, a first line electrode, a second touch electrode, a second line electrode, and a color filter layer, the color filter layer comprising a first color filter and a second color filter, the touch unit being configured to detect a touch position on the touch display panel,
- wherein the second substrate is between the first substrate and the third substrate, and
- wherein the first touch electrode is a light blocking electrode and is disposed at a boundary between the first color filter and the second color filter,
- wherein the second touch electrode comprises a transparent conductive material and extends in a direction crossing the first touch electrode, and
- wherein the first line electrode is electrically connected to the first touch electrode, the first line electrode is thicker than the first touch electrode, and the first line electrode and the first touch electrode comprise a same material as each other.

17. The touch display panel of claim 16, wherein the display unit comprises a electrophoretic layer disposed between the first substrate and the first portion of the second substrate.

18. The touch display panel of claim 17, wherein a common electrode is disposed on the first portion of the second substrate and a pixel electrode is disposed on the first substrate, and the electrophoretic layer is disposed between the common electrode and the pixel electrode, the electrophoretic layer comprising at least one electrophoretic ball.

19. The touch display panel of claim 18, wherein the second substrate is separated from the third substrate by a spacer.

20. The touch display panel of claim 19, wherein the color filter layer is disposed on the second portion of the second substrate.

21. The touch display panel of claim 19, wherein the color filter layer is disposed on the third substrate.

22. The touch display panel of claim 21, wherein the color filter layer comprises a light hole.

23. The touch display panel of claim 21, wherein the touch unit further comprises a reflecting plate disposed on the second portion of the second substrate, the reflecting plate being located at the light hole, the reflecting plate comprising a metallic material, which is the same as the material of the first electrode.

* * * * *